US009418508B2

(12) United States Patent
Cuddy et al.

(10) Patent No.: US 9,418,508 B2
(45) Date of Patent: Aug. 16, 2016

(54) SYSTEM AND METHOD FOR PROVIDING A BONUS GAME ON A BINGO BASED GAME

(71) Applicant: Video Gaming Technologies, Inc., Franklin, TN (US)

(72) Inventors: Ryan Cuddy, Reno, NV (US); Lyndsay Nelson, Reno, NV (US); David Rehm, Franklin, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

(21) Appl. No.: 14/579,649

(22) Filed: Dec. 22, 2014

(65) Prior Publication Data

US 2015/0111631 A1 Apr. 23, 2015

Related U.S. Application Data

(63) Continuation of application No. 13/727,407, filed on Dec. 26, 2012, now Pat. No. 9,098,971.

(51) Int. Cl.

*G06F 17/00* (2006.01)
*G07F 17/32* (2006.01)

(52) U.S. Cl.

CPC .......... *G07F 17/3225* (2013.01); *G07F 17/329* (2013.01); *G07F 17/3267* (2013.01)

(58) Field of Classification Search

USPC ...................................................... 463/16–25
See application file for complete search history.

(56) References Cited

U.S. PATENT DOCUMENTS

| | | | | |
|---|---|---|---|---|
| 7,481,707 | B1 | 1/2009 | Luciano, Jr. et al. | |
| 7,708,634 | B2 | 5/2010 | Padgett | |
| 7,753,774 | B2 | 7/2010 | Gail et al. | |
| 2004/0152508 | A1 | 8/2004 | Lind et al. | |
| 2005/0043079 | A1 | 2/2005 | Huang | |
| 2005/0059471 | A1 | 3/2005 | Cannon | |
| 2006/0035700 | A1 | 2/2006 | Van Asdale | |
| 2006/0111168 | A1 | 5/2006 | Nguyen et al. | |
| 2007/0117608 | A1 | 5/2007 | Roper et al. | |
| 2007/0243925 | A1 * | 10/2007 | LeMay et al. | 463/20 |
| 2009/0048022 | A1 | 2/2009 | Iddings et al. | |
| 2010/0124988 | A1 | 5/2010 | Amos et al. | |
| 2011/0009180 | A1 | 1/2011 | Luciano, Jr. et al. | |
| 2011/0287823 | A1 | 11/2011 | Guinn et al. | |
| 2012/0115599 | A1 | 5/2012 | Conway et al. | |
| 2013/0165209 | A1 * | 6/2013 | Lemay et al. | 463/25 |
| 2013/0165210 | A1 * | 6/2013 | Nelson et al. | 463/25 |

* cited by examiner

*Primary Examiner* — Ronald Laneau
(74) *Attorney, Agent, or Firm* — Armstrong Teasdale LLP

(57) ABSTRACT

The gaming system that includes a server, a gaming machine communicatively coupled to the server, and a processor. The processor is programmed to: upon receiving a wager at the gaming machine, provide a bingo based game on the gaming machine, the bingo based game comprising gaming content that includes at least one bingo game card, determine that a triggering event has occurred during play of the bingo based game, and based on the triggering event, provide the player with at least one free bingo card in a bingo based bonus game.

20 Claims, 4 Drawing Sheets

SYSTEM AND METHOD FOR PROVIDING A BONUS GAME ON A BINGO BASED GAME

CROSS-REFERENCE TO RELATED APPLICATIONS

This application is a continuation of prior application Ser. No. 13/727,407, filed on Dec. 26, 2012, which is hereby incorporated by reference in its entirety.

BACKGROUND OF THE INVENTION

The embodiments described herein relate generally to gaming machines and, more particularly, to systems and methods for providing a bonus game on a Class II bingo based game.

Federally, traditional bingo is classified as Class II gaming by the National Indian Gaming Commission. This includes the basic characteristics of requiring more than one participant, having a preannounced prize and pattern for a winner to complete on bingo cards sold prior to commencement of the game, a random number call and an element of competition between players.

In response to player demand for novelty in this age of computers and electronic gaming devices, the bingo industry is faced with providing new and improved bingo based games without violating the rules of Class II gaming. Thus, the challenge facing Class II bingo game operators is maintaining the integrity of traditional bingo while, at the same time, satisfying player novelty demand and cultivating player loyalty.

BRIEF DESCRIPTION OF THE INVENTION

In one aspect, a gaming system is provided. The gaming system includes a server, a gaming machine communicatively coupled to the server, and a processor programmed to: upon receiving a wager at the gaming machine, provide a bingo based game on the gaming machine, the bingo based game comprising gaming content that includes at least one bingo game card, determine that a triggering event has occurred during play of the bingo based game, and based on the triggering event, provide the player with at least one free bingo card in a bingo based bonus game.

In another aspect, a method for providing a bonus game on a bingo based game, the method comprising providing a bingo based game to a player operating a gaming machine, the bingo based game comprising gaming content that includes at least one bingo game card, determining that a triggering event has occurred during play of the bingo based game, and based on the triggering event, providing the player with at least one free bingo card in a bingo based bonus game.

In yet another aspect, one or more computer storage media embodying computer-executable instructions stored thereon for providing a bonus game on a bingo based game is provided. The instructions include providing a bingo based game to a player operating a gaming machine, the bingo based game comprising gaming content that includes at least one bingo game card, determining that a triggering event has occurred during play of the bingo based game, and based on the triggering event, providing the player with at least one free bingo card in a the bingo based bonus game.

DETAILED DESCRIPTION OF THE INVENTION

Exemplary embodiments of systems and methods for use providing a bonus game on a Class II bingo based game are described herein. Currently, providing a bonus game on a Class II bingo based game can be extremely difficult. For example, once a triggering event occurs (e.g., a particular pattern on a bingo card is achieved) in a current Class II bingo base game, and credits are awarded for the triggering event, a bonus game initiated from the triggering event must utilize the credits awarded for the triggering event for providing future winnings during the bonus game. Thus, in attempt to satisfy the rules of Class II gaming, the credits awarded in the base game are split between each bingo card used in the bonus game. However, splitting up the credits in this way proves to be extremely difficult when the number of bingo game cards that will be used in the bonus game is unknown. For example, the number of bingo cards used in a bonus game can be as few as one, or as many as several hundred. Embodiments of the present disclosure provide a bonus game on a Class II bingo based game and eliminate the deficiencies of current Class II bonus games by providing a player with at least one free bingo card in a bingo based bonus game. As such, the free bingo based bonus card is independent of the bingo based game, and therefore, not held under the same constraints as a bingo based bonus card that must share a portion of the credits from the base game.

Exemplary technical effects of systems and methods described herein include at least one of: (a) providing a Class II bingo based game to a player operating a gaming machine, the Class II bingo based game comprising gaming content that includes at least one bingo game card; (b) determining that a triggering event has occurred during play of the Class II bingo based game; and (c) based on the triggering event, providing the player with at least one free bingo card in a bingo based bonus game.

Figure 1:
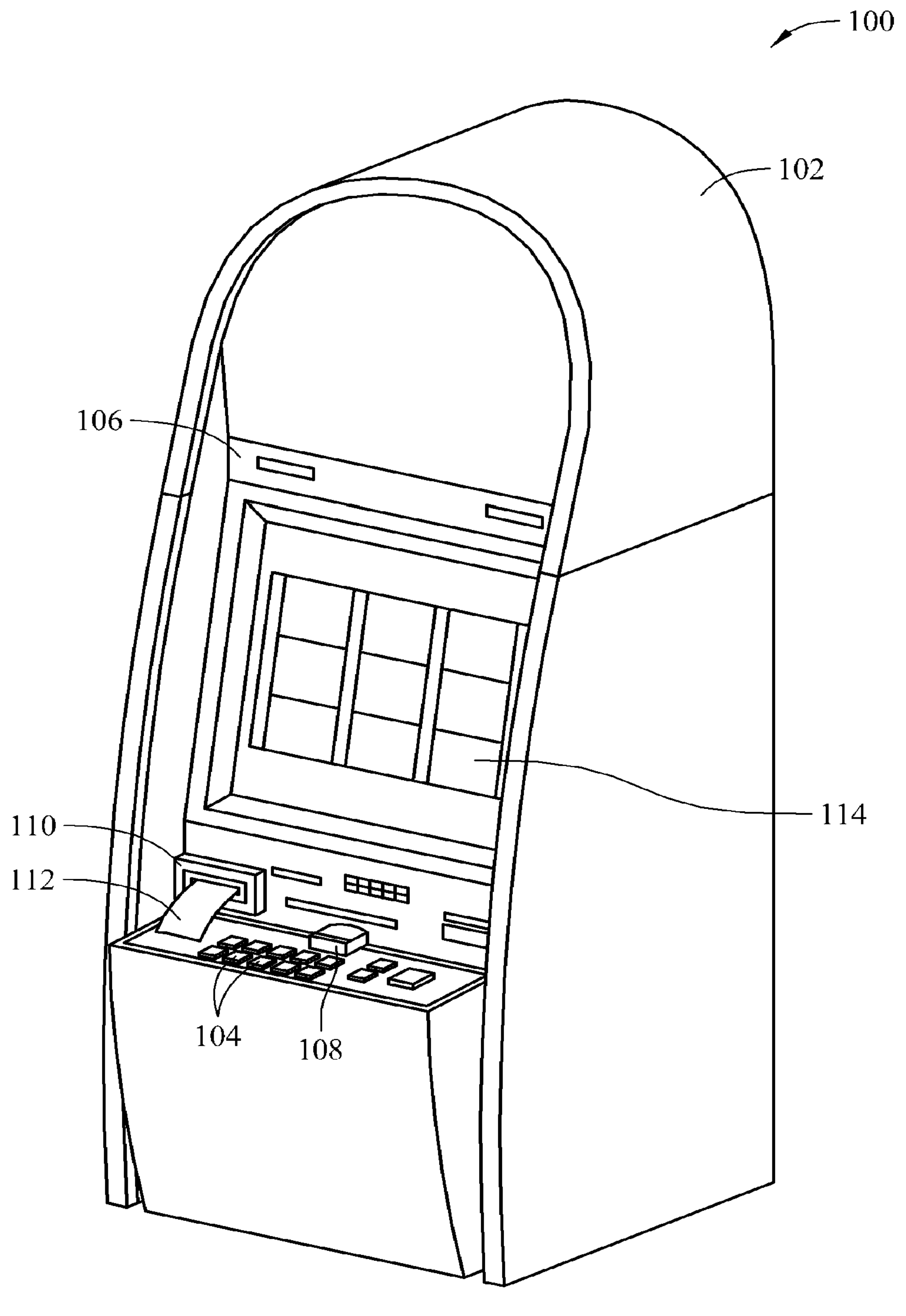
FIG. 1 is a schematic diagram of an exemplary gaming machine.

FIG. 1 is a schematic diagram of an exemplary gaming machine 100 (e.g., a Class II configured gaming machine) that facilitates providing a bonus game on a Class II bingo based game. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a “Bet One” button that enables the player to place a bet or to increase a bet. Another button 104 may be a “Bet Max” button that enables the player to bet a maximum permitted wager. Yet another button 104 may be a “Cash Out” button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game images, symbols, and/or indicia such as a visual representation or exhibition of movement of an object (e.g., a mechanical, virtual, or video reel), dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
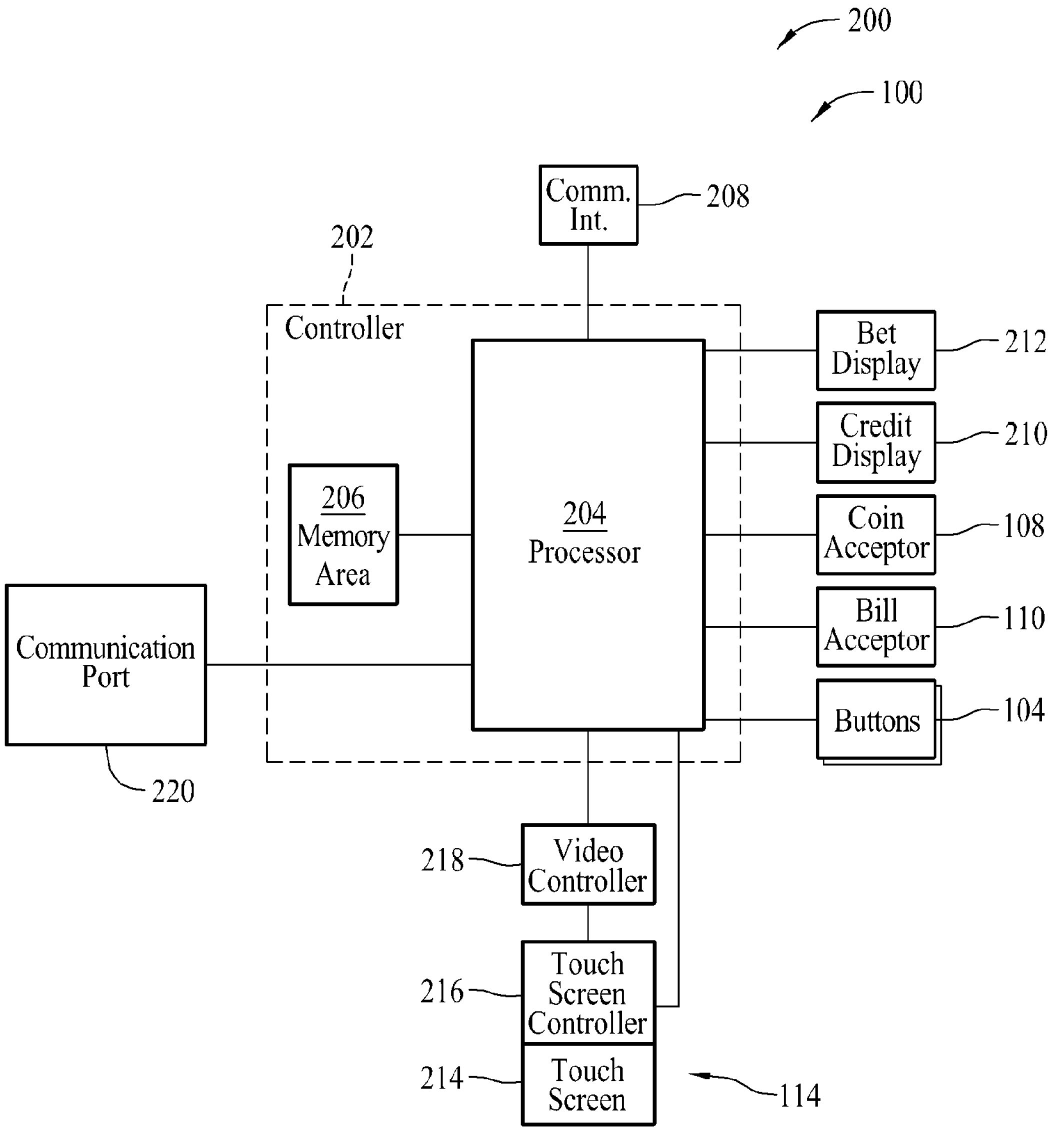
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled to a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Communication interface 208 may operate as an input device (e.g., by receiving data from another device) and/or as an output device (e.g., by transmitting data to another device). Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, trigger event conditions, game play events, a list of predefined periods of time to execute the game play events, game play outcomes, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination. In one embodiment, the above data and program code and instructions, executable by processor 204 for providing a bonus game on a Class II bingo based game may be stored and executed from a memory area remote from computing device gaming machine 100. For example, the data and the computer-executable instructions may be stored in a cloud service, a database, or other memory area accessible by gaming machine 100. Such embodiments reduce the computational and storage burden on gaming machine 100. As such, memory area 206 may be a local and/or a remote computer storage media including memory storage devices.

In the exemplary embodiment, gaming machine 100 includes a credit display 210, which displays a player's current number of credits, cash, account balance or the equivalent. Gaming machine 100 also includes a bet display 212, which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. In such embodiments, presentation device 114 may operate as an input device in addition to presenting information. A video controller 218 is communicatively coupled to controller 202 and touch screen controller 216 to enable a player to input game play decisions (e.g., actions) into gaming machine 100 via touch screen 214. Furthermore, gaming machine 100 includes one or more communication ports 220 that enable controller 202 to communicate with external peripheral devices (not shown) such as, but not limited to, external video sources, expansion buses, other displays, a SCSI port, or a key pad.

Figure 3:
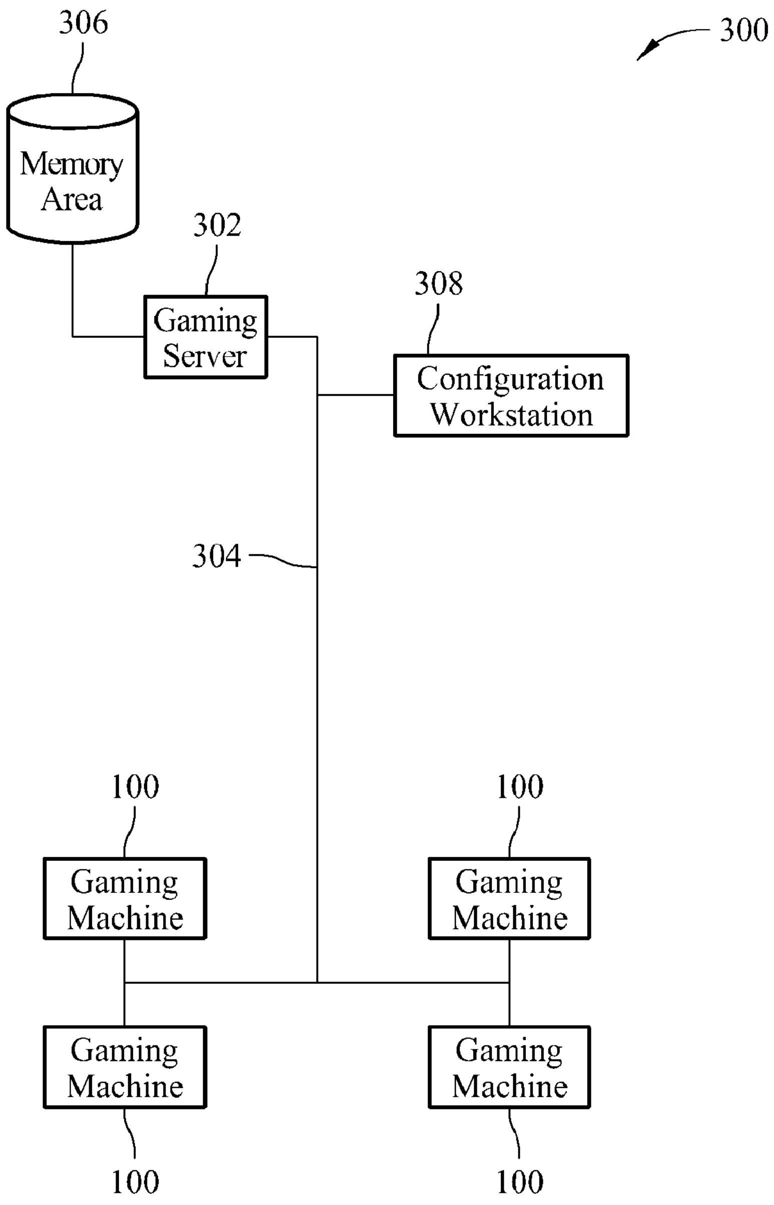
FIG. 3 is a block schematic diagram of an exemplary gaming system that includes a plurality of gaming machines shown in FIG. 1.

FIG. 3 is a block schematic diagram of an exemplary gaming system 300 (e.g., a Class II gaming system) that includes a plurality of gaming machines 100. Each gaming machine 100 is coupled via communication interface 208 (shown in FIG. 2) to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

In one embodiment, one or more gaming machines 100 may be remote gaming machines that access a casino over network 304. In this embodiment, it will be understood that a player operating a remote gaming machine has virtual access to any casino coupled to network 304 and associated with gaming server 302. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance, remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 302. In such an embodiment, gaming machines 100 display results of a game via presentation device 114 (shown in FIGS. 1 and 2).

In one embodiment, gaming server 302 performs a plurality of functions including, for example, game outcome generation, executing a game play event for a player, executing a bingo based bonus game, player tracking functions, and/or accounting functions, to name a few. However, in alternative embodiments, gaming system 300 may include a plurality of servers that separately perform these functions and/or any suitable function for use in a network-based gaming system.

In some embodiments, gaming server 302 provides a Class II game of chance (e.g., bingo) to a player operating one of gaming machines 100. A typical game play cycle for a bingo game implemented on gaming machines 100 will now be described with reference to FIG. 3.

Initially, a player requests to place a wager on a game of chance. Thereafter, gaming server 302 accesses a directory, brief description, and a schedule of all available games from memory area 306 and sends the information to the player. In one embodiment, choosing an amount wagered per chance/bingo card during the game of chance is predefined by, for example, gaming server 302. However, once the player has selected a game of chance (e.g., a bingo game), and prior to a start of the bingo game, gaming server 302 may also query the player as to a preference on these strategic decisions. For example, gaming server 302 may determine an amount a player wants to wager per chance/bingo card. As such, this information may be stored in memory area 306 and used to limit the necessary player interaction during a play of a game of chance.

When a time before a start of a particular bingo game is less than a preset time, gaming server 302 notifies each player that the game is closed. When the bingo game begins, gaming server 302 accepts a ball drawing result after a ball is called. Once an identification of the ball is established, gaming server 302 correlates the identification of the ball with each player's bingo card(s). If, upon receipt of a triggering event (e.g., a designated pattern is achieved) by one of the players, gaming server 302 may either end the bingo based game and provided the player that achieved the designated pattern an award, or gaming server 302 may initiate a bingo based bonus game for that particular player. In one embodiment, gaming server 302 provides the player an award and/or at least one free bingo card for play in the bingo based bonus game.

In addition, gaming server 302 may also track data of players using gaming machines 100. For example, gaming server 302 can store physical characteristics of players, such as, but not limited to, a gender of a player and an age of a player. Gaming server 302 can also track and store other data related to the players using player tracking identification, such as a player card. For example, gaming server 302 can store information about a player, such as loyalty points, player address, phone number, and/or any information that may be retrieved and transmitted to gaming machines 100. In some embodiments, gaming server 302 stores and tracks information such as, but not limited to, an average amount of a wager played at gaming machines 100, any funds a player may have in an account, as well as data relating to reportable events.

Figure 4:
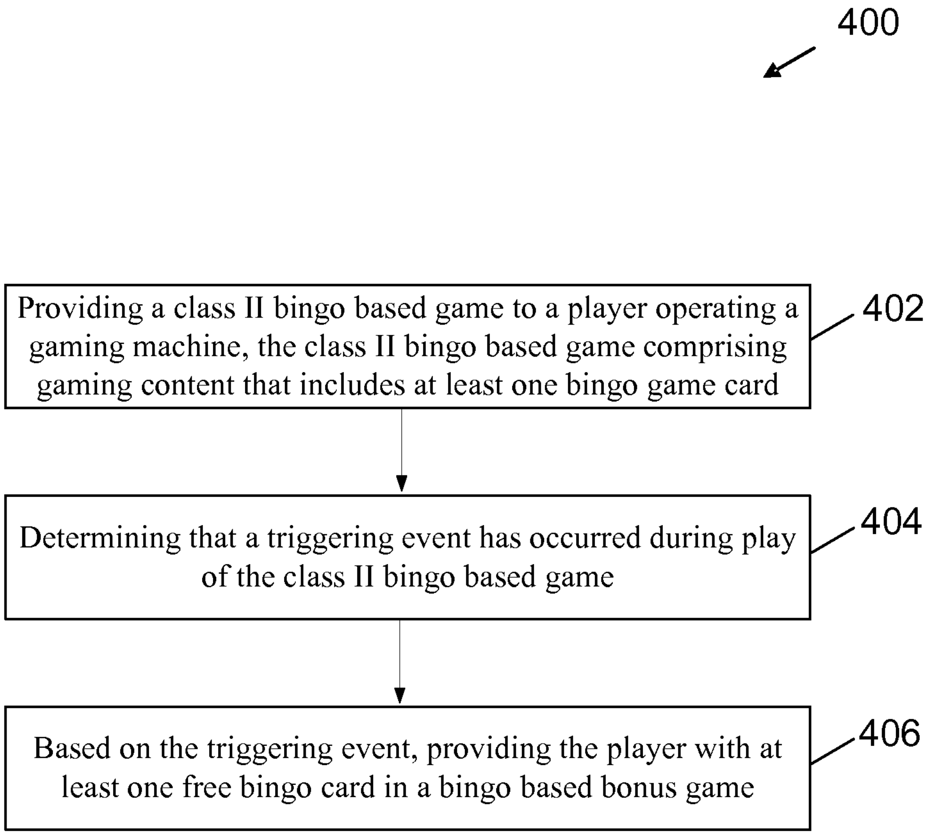
FIG. 4 is a flowchart that illustrates an exemplary method for providing a bonus game on a Class II bingo based game.

With reference now to FIG. 4, a flowchart that illustrates an exemplary method 400 for use with gaming system 300 (shown in FIG. 3) is provided. Operations in method 400 may be performed by one or more gaming machines 100, by gaming server 302, and/or by any other computing device or combination thereof. In exemplary embodiments, and referring to FIGS. 2, 3, and 4, a Class II bingo based game is provided to a player on a gaming machine (e.g., one of gaming machines 100) at 402. For example, upon receipt of a wager by a player operating a gaming machine (e.g., gaming machine 100), a Class II bingo based game is provide to the player on gaming machine 100. At 404, a triggering event is determined to have occurred during play of the bingo based game. In one embodiment, a triggering event may be a designated pattern that is achieved or simply a designated ball that has been called and claimed by the player on a particular bingo card in the bingo based game. In one embodiment, the designated pattern is a game ending pattern for the bingo based game. In another embodiment, the designated pattern is not a game ending pattern for the bingo based game.

At 406, based on the triggering event, the player is provided with at least one free bingo card in a bingo based bonus game. In one embodiment, the player may also receive an award/credit in addition to receiving the at least one free bingo card. As mentioned above, in current Class II bingo based games, the award/credits for the bingo based game are split up among each of the bingo cards in the bonus game as they are played. However, embodiments of the present disclosure enable a player to win a free bingo card for a bingo based bonus game based on a triggering event. As such, play of the free bingo card in the bingo based bonus game is independent of the bingo based game and also independent of the credits/awards given during the bingo based bonus game. Therefore, if a triggering event is achieved on a free bingo card in a bingo bonus game, one or more additional free bingo cards may be provided.

In one embodiment, a limit may be on how many free bingo cards a player may be awarded during play of a particular bingo based bonus game. For example, as explained above, based on the triggering event, the player is provided with at least one initial free bingo card in a bingo based bonus game. However, a player may win additional free bingo cards during play of the initial free bingo card. Furthermore, a player may win more free bingo cards during play of each of the additional free bingo cards. As such, a limit may be provided as to how many free bingo cards may be given to the player during a particular bingo based bonus game. In one embodiment, once a triggering event has occurred that initiates an award of an additional free bingo card, it is first determined whether or not the number of free bingo cards has reached a defined threshold for the particular bingo based bonus game. If the number of free bingo cards has not reached the defined threshold, then a player is awarded another free bingo card. However, if the number of free bingo cards has reached the defined threshold, the player is not awarded a free bonus card and play continues on any remaining free bingo cards.

In one embodiment, either in place of, or in addition to setting a limit on a number of free bingo cards that may be provided during a particular bingo based bonus game, a time limit may also be applied to the bingo based bonus game. For example, the time limit may be a period of time a player is able to win additional free bingo cards during the bingo based bonus game. Thus, once the period of time expires, the player is no longer able to win additional free bingo cards during the particular bingo based bonus game. In a further embodiment, a time limit may be placed on the bingo based bonus game itself. Thus, at the end of the time limit, the bingo based bonus game ends.

In another embodiment, play continues on the bingo based bonus game until a game ending pattern is achieved on the free bingo card or on each of the one or more free bingo cards if more than one free bingo card has been provided during the bingo based bonus game. Thus, if additional free bingo cards are awarded to a player during play of an initial free bingo card, the bingo based bonus game does not end until the initial free bingo card and each of the additional free bonus cards have achieved a game ending pattern. In one embodiment, the game ending pattern may be a different pattern for each of the free bingo cards provided during the bingo based bonus game. In another embodiment, the game ending pattern may be shared among two or more of the free bingo cards. However, once the bingo based bonus game has ended, play continues on the bingo based game. In one embodiment, the bingo based bonus games may also end when a game ending pattern is achieved on any free bingo card during play of the bingo based bonus game. In another embodiment, a bingo based bonus game may include a plurality of the embodiments described above. For example, the bingo based bonus game may have two or more of: a time limit on the bingo based bonus game, a time limit during which free bingo cards may be awarded, a limit on a number of free bingo cards that may be awarded, game ending patterns for each of the free bingo cards, and a game ending pattern for the bingo based bonus game itself. Additionally, the termination event of the bonus bingo game can be predefined, or randomly determined. For example, in a randomly determined configuration, the duration of the bonus time window, or the quantity of the bonus bingo cards to be awarded, or the game ending pattern, etc., can be randomly generated before or during a bonusing event.

One of ordinary skill in the art, guided by the teaching herein will appreciate that one or more operations in method 400 may be performed repeatedly. For example, game play events may be received repeatedly, and at least a portion of the steps described above may be performed based on each game play event.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming system comprising:
- a server;
- a gaming machine communicatively coupled to the server, the gaming machine comprising:
  - at least one of a coin acceptor, a bill validator, a card reader, and a ticket reader configured to receive credit input to establish a credit balance for a player; and
  - a player interface configured to accept a wager against the credit balance from the player; and
- a processor programmed to:
  - provide a bingo based game on the gaming machine upon receipt of the wager, the bingo based game comprising gaming content that includes at least one bingo game card;
  - determine a bingo based game outcome for the at least one bingo game card, wherein the bingo based game outcome is determinable at the server;
  - determine that a triggering event has occurred during play of the bingo based game; and
  - based on the triggering event, provide the player with at least one free bingo card in a bingo based bonus game, wherein a bingo based bonus game award is determinable independent of the wager and the bingo based game outcome.

2. A gaming system in accordance with claim 1, wherein determining that a triggering event has occurred comprises determining that a designated pattern has been achieved on the at least one bingo game card.

3. A gaming system in accordance with claim 2, wherein the processor is further programmed to provide the player with an award based on the determining that a designated pattern has been achieved on the at least one bingo game.

4. A gaming system in accordance with claim 2, wherein the designated pattern is a game ending pattern.

5. A gaming system in accordance with claim 2, wherein the designated pattern in not a game ending pattern.

6. A gaming system in accordance with claim 1, wherein the processor is further programmed to end the at least one free bingo game when a designated pattern has been achieved on the at least one free bingo game card.

7. A gaming system in accordance with claim 1, wherein a quantity of free bingo cards provided to the player is determined based on the triggering event.

8. A gaming system in accordance with claim 1, wherein the processor is further programmed to:
- determine that a second triggering event has occurred in the bingo based bonus game; and
- based on the second triggering event, provide the player with at least a second free bingo card in a second bingo based bonus game.

9. A gaming system in accordance with claim 8, wherein determining that a second triggering event has occurred comprises determining that a second designated pattern has been achieved on the at least one free bingo game card.

10. A method for providing a bonus game on a bingo based game, the method comprising:
- receiving credit input from a player using at least one of a coin acceptor, a bill validator, a card reader, and a ticket reader to establish a credit balance;
- accepting a wager against the credit balance for a bingo based game;
- providing the bingo based game to the player, the bingo based game comprising gaming content that includes at least one bingo game card;
- determining a bingo based game outcome for the at least one bingo game card, wherein the bingo based game outcome is determinable at a server;
- determining that a triggering event has occurred during play of the bingo based game;
- based on the triggering event, providing the player with at least one free bingo card in a bingo based bonus game; and
- determining a bingo based bonus game award independent of the wager and the bingo based game outcome.

11. A method in accordance with claim 10, wherein determining the triggering event has occurred comprises determining that a designated pattern has been achieved on the at least one bingo game card.

12. A method in accordance with claim 11, wherein the designated pattern is a game ending pattern.

13. A method in accordance with claim 10, further comprising ending the at least one free bingo game when a designated pattern has been achieved on the at least one free bingo game card.

14. A method in accordance with claim 10, further comprising:
- determining that a second triggering event has occurred in the bingo based bonus game; and
- based on the second triggering event, providing the player with at least a second free bingo card in a second bingo based bonus game.

15. A method in accordance with claim 14, wherein determining that a second triggering event has occurred comprises determining that a second designated pattern has been achieved on the at least one free bingo game card.

16. One or more non-transitory computer storage media embodying computer-executable instructions stored thereon for providing a bingo based bonus game on a bingo based game, the instructions comprising the steps of:
- receiving credit input from at least one of a coin acceptor, a bill validator, a card reader, and a ticket reader of a gaming machine to establish a credit balance;
- accepting a wager against the credit balance for a bingo based game;
- providing a bingo based game to a player operating the gaming machine, the bingo based game comprising gaming content that includes at least one bingo game card;
- determining a bingo based game outcome for the at least one bingo game card, wherein the bingo based game outcome is determinable at a server;
- determining that a triggering event has occurred during play of the bingo based game;
- based on the triggering event, providing the player with at least one free bingo card in the bingo based bonus game; and
- determining a bingo based bonus game award independent of the wager and the bingo based game outcome.

17. The non-transitory computer storage media in accordance with claim 16, wherein determining that a triggering event has occurred comprises determining that a designated pattern has been achieved on the at least one bingo game card.

18. The non-transitory computer storage media in accordance with claim 17, wherein the designated pattern is a game ending pattern.

19. The non-transitory computer storage media in accordance with claim 16, further comprising ending the at least one free bingo game when a designated pattern has been achieved on the at least one free bingo game card.

20. The non-transitory computer storage media in accordance with claim 16, further comprising:

determining that a second triggering event has occurred in the bingo based bonus game; and based on the second triggering event, providing the player with at least a second free bingo card in a second bingo based bonus game.

* * * * *